(12) United States Patent
Jang et al.

(10) Patent No.: US 7,113,764 B1
(45) Date of Patent: Sep. 26, 2006

(54) METHOD FOR TRANSMITTING EMERGENCY CALL OF MOBILE PHONE

(75) Inventors: Dae Won Jang, Seoul (KR); Hee Jung Lee, Bucheon (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 09/671,115

(22) Filed: Sep. 28, 2000

(30) Foreign Application Priority Data

Sep. 29, 1999 (KR) ............................... 1999-41802

(51) Int. Cl.
 *H04M 11/04* (2006.01)
(52) U.S. Cl. ............................... 455/404.1; 455/404.2; 455/407; 455/414.2; 455/426.1; 455/456.1; 455/456.2; 455/456.3; 455/456.6; 455/521
(58) Field of Classification Search ................ 455/404, 455/456, 404.1, 456.1, 456.2, 456.3, 404.2, 455/414.1, 414.2, 426.1, 456.6, 514, 521
See application file for complete search history.

(56) References Cited

U.S. PATENT DOCUMENTS

| | | | |
|---|---|---|---|
| 5,732,349 A | 3/1998 | Sanpei et al. ............... 455/435 |
| 5,946,618 A * | 8/1999 | Agre et al. ................. 455/428 |
| 6,073,005 A * | 6/2000 | Raith et al. ............... 455/404.1 |
| 6,115,596 A * | 9/2000 | Raith et al. ............... 455/404.2 |
| 6,181,930 B1 * | 1/2001 | Lee ......................... 455/426.1 |
| 6,321,098 B1 * | 11/2001 | Beith et al. ................. 455/564 |
| 6,374,078 B1 * | 4/2002 | Williams et al. ............... 455/7 |
| 6,374,099 B1 * | 4/2002 | Bi et al. .................. 455/404.1 |
| 6,374,103 B1 * | 4/2002 | Kamel et al. ............... 455/434 |
| 6,501,420 B1 * | 12/2002 | Townsend et al. ....... 342/357.1 |
| 6,510,235 B1 * | 1/2003 | Shin et al. .................. 382/100 |
| 6,519,466 B1 * | 2/2003 | Pande et al. ............. 455/456.1 |
| 6,625,132 B1 * | 9/2003 | Boettger et al. ............ 370/329 |

FOREIGN PATENT DOCUMENTS

| | | |
|---|---|---|
| EP | 707574 A2 * | 12/1995 |
| WO | WO 98/23108 | 5/1998 |
| WO | WO9823108 * | 5/1998 |
| WO | WO 98/27782 | 6/1998 |
| WO | WO 98/48577 | 10/1998 |

OTHER PUBLICATIONS

TIA/EIA Standard TIE/EIA-95-B, "Mobile Station-Base Station Compatibility Standard for Wideband Spread Spectrum Cellular Systems," ANSI, Mar. 1999, pp. 7-83, 7-74, 7-206 to 7-212 (XP864204).

* cited by examiner

*Primary Examiner*—Matthew Anderson
*Assistant Examiner*—Sujatha Sharma
(74) *Attorney, Agent, or Firm*—Fleshner & Kim LLP.

(57) ABSTRACT

A method for transmitting an emergency call of a mobile phone includes the steps of: receiving position recognition information from a base station via a forward channel in roaming a mobile terminal; varying a search position on an emergency call mapping table previously stored in a memory according to the received position recognition information; and transmitting a call by a phone number set on the varied search position when an emergency call needs to be transmitted. With this method, even though the user is not aware of the emergency call number of a country or an area where he uses his mobile phone to make an emergency call or even though he or she is not aware of a one-touch dial number or a manual for making a call, the user can easily make an emergency call. Moreover, by linking the read address of the phone book, in which the emergency call number has been stored, to the key for making an emergency call, making an emergency call can be promptly performed automatically by one-time key manipulation.

24 Claims, 3 Drawing Sheets

| COUNTRY | MCCm<br>(MOBILE COUNTRY CODE) | EMERGENCY # |
|---|---|---|
| KOREA | 450(0x15d) | 119 |
| USA | (0x3ff) | 911 |
| CANADA | (0x302) | 911 |
| BRAZIL | 724 | 190 |
| PERU | 051 | 911 |
| VENEZUELA | 058 | 911 |
| CHILE | 730 | 911 |
| MEXICO | | 911 |
| JAPAN | | 119 |
| NEW ZEALAND | | 111 |
| SINGAPORE | | 995 |
| EUROPEAN | | 112 |
| ⋮ | ⋮ | ⋮ |

METHOD FOR TRANSMITTING EMERGENCY CALL OF MOBILE PHONE

BACKGROUND OF THE INVENTION

1. Field of the Invention

The present invention relates to a method for transmitting an emergency call of a mobile phone.

2. Description of the Background Art

FIG. 1. illustrates a general mobile phone (mobile terminal).

As shown in the drawing, the mobile phone includes a main body 1, an LCD 2, and a key pad unit 3 provided with keys for inputting a phone number and a text data and other various function keys. In this respect, the function keys refer to keys for searching, storing, deleting and menu selection keys.

A communicating method of the mobile phone constructed as described above will now be explained.

1) General Communication

When a mobile phone is powered-up, it receives a pilot channel, a synchronous channel and a paging channel through a forward channel between the mobile phone and a base station, by which the mobile phone is ready for providing service to a user.

In this state, a user inputs a phone number of a called party by operating a key pad (3) of the mobile phone. And, the user confirms whether the phone number of a called party has been properly inputted through the LCD 2. Upon confirmation of proper inputting, the user presses a communication key (or 'SEND'). Then, a call is established between the user and the called party through a base station, a base station controller and a mobile switching center, so that the user can communication with the called party by means of the mobile phone.

At this time, the signal is transmitted from the mobile phone to the base station through a reverse channel. That is, a voice or (a data) and signal information are transmitted via a reverse communication channel, while a response to a message received via a paging channel is transmitted via an access channel.

2) Emergency Communication

A phone number for an emergency call is distinguished from general phone numbers. For example, a phone number for a crime report is 112 and a phone number for a fire or a disaster reports is 119. Accordingly, the user directly inputs a phone number for an emergency call by operating the key pad (3) of the mobile phone to communicate with a called party in the same manner as the general communication.

In detail, the user inputs a phone number, i.e., '112', for an emergency call through a normal dialing method. The inputted phone number ('112') is compared with a mapping table stored in a memory unit (not shown) of the mobile phone, to check whether there is a corresponding phone number ('112') in the mapping table. At this time, in case that the corresponding phone number ('112') exists in the mapping table, its area position is identified to check whether the corresponding phone number ('112') is identical to the emergency call number of the recognized area.

In case that the phone number ('112') is identical to the emergency call number of the recognized area, it is called as it is, while, in case that the phone number ('112') is not identical to the emergency call number of the recognized area, the phone number ('112') is replaced with an emergency phone number of the corresponding area provided by the mapping table, thereby trying to make an emergency call.

The mobile phone user may store a phone number for an emergency call in a memory region of the mobile phone by using the function keys provided to the mobile phone, so that he or she can try to make an emergency call by operating a one-touch dial.

Recently, as an agreement has been made between service providers to provide a roaming service to users by using a system of a different communication providers, a communication area of a mobile phone is gradually extended from a domestic communication area to an international communication service area. Accordingly, with the mobile phone registered in a domestic area, the user can be provided with the same communication service even in a foreign country.

Therefore, in case that the user wants to make an emergency call in a foreign country with the mobile phone registered in his or her own country, the user should be aware of the emergency phone number of the country or the area that he or she wants to stay and use his or her mobile phone, or the user should store the emergency phone number in the mobile phone in advance.

In this respect, however, in case that the user goes to a foreign country for a travel or a for a business trip, it is not easy for the user to be aware of an emergency phone number of the foreign country. Besides a special occasion, for most users, it is hardly expected for them to know the emergency phone number of the foreign country or to store the emergency phone number in a memory unit of the mobile phone.

Therefore, in the past, unless the user is aware of the emergency phone number of the foreign country where he or she stays and uses use a mobile phone, or unless the user is aware of a one-touch dial number or its manual, the user can not use the emergency call or time for calling an emergency call is delayed.

SUMMARY OF THE INVENTION

Therefore, an object of the present invention is to provide a method for transmitting an emergency call of a mobile phone which is capable of making an emergency call promptly in occurrence of emergency situation.

Another object of the present invention is to provide a method for transmitting an emergency call of a mobile phone which is capable of automatically making an emergency call by having an additional key for an emergency call.

To achieve these and other advantages and in accordance with the purpose of the present invention, as embodied and broadly described herein, there is provided a method for transmitting an emergency call of a mobile phone including the steps of: receiving position recognition information from a base station via a forward channel in roaming a mobile terminal; varying a search position on an emergency call mapping table previously stored in a memory according to the received position recognition information; and transmitting a call by a phone number set on the varied search position when an emergency call is inputted.

To achieve the above objects, there is also provided a method for transmitting an emergency call of a mobile phone including the steps of: updating and storing position recognition information received from a base station in a memory; comparing the position recognition information stored in the memory and the position recognition information pre-set in the mapping table to recognize an emergency call number; and trying to transmit an emergency call by using the recognized emergency call number.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, a key for transmitting an emergency call is additionally designated in a mobile phone or a specific key, i.e., number '9' key (generally it is displayed in a red color) is designated for a one-touch key, thereby making an emergency call. Therefore, the method for transmitting of an emergency call of a mobile phone is operable by software, without requiring any additional element in terms of hardware.

Figures 1, 2:
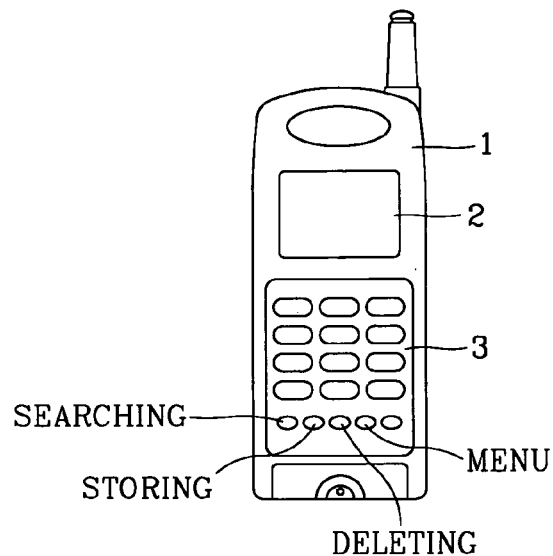
FIG. 1 illustrates a general mobile phone (mobile terminal).
FIG. 2 illustrates a mapping table storing MCC and emergency phone numbers by countries adopted in the present invention.

In addition, as shown in FIG. 2, the mapping table including the MCCs and emergency call numbers by countries is stored in the memory region of the mobile phone. Accordingly, an worldwide database of emergency call numbers can be constructed by corresponding emergency call number used by countries or areas to the MCC, that is, a country code, by using the mapping Method for transmitting an emergency call of a mobile phone will now be described in detail.

When the mobile phone is first powered-up, the mobile phone receives a pilot channel, synchronous channel and a paging channel via a forward channel from a base station, and in this state, the mobile phone receives an extended system parameters message (ESPM) among overhead messages of the paging channel. The ESPM includes a field having the MCC (Mobile Country Code) values, so that the mobile phone stores the MCC field values upon receipt of the ESPM.

The paging channel can be largely divided into an overhead message transmitted to every mobile phone in a service area and a personal station directed message transmitted to a specific mobile phone. The overhead message includes information related to connection of a mobile station, frequency information of a base station, information on international roaming and information on neighboring base station. The personal station directed message includes a message for paging, a command and a channel allocation message.

And, the mobile phone includes a first register storing an inherent MCCp and a second register for storing the MCCs transmitted through the ESPM. Accordingly, the mobile phone stores the initial data transmitted from the base station in the MCCs, and compares it with a data periodically transmitted from a base station, to thereby update the data.

Figure 3:
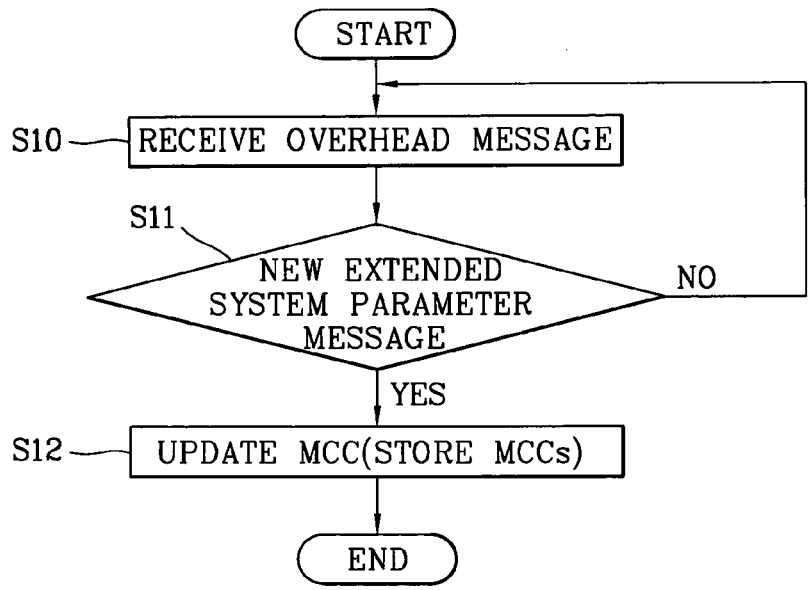
FIG. 3 is a flow chart of a process of updating and storing an MCC in a method for transmitting an emergency call of a mobile phone in accordance with a first embodiment of the present invention.
Figure 4:
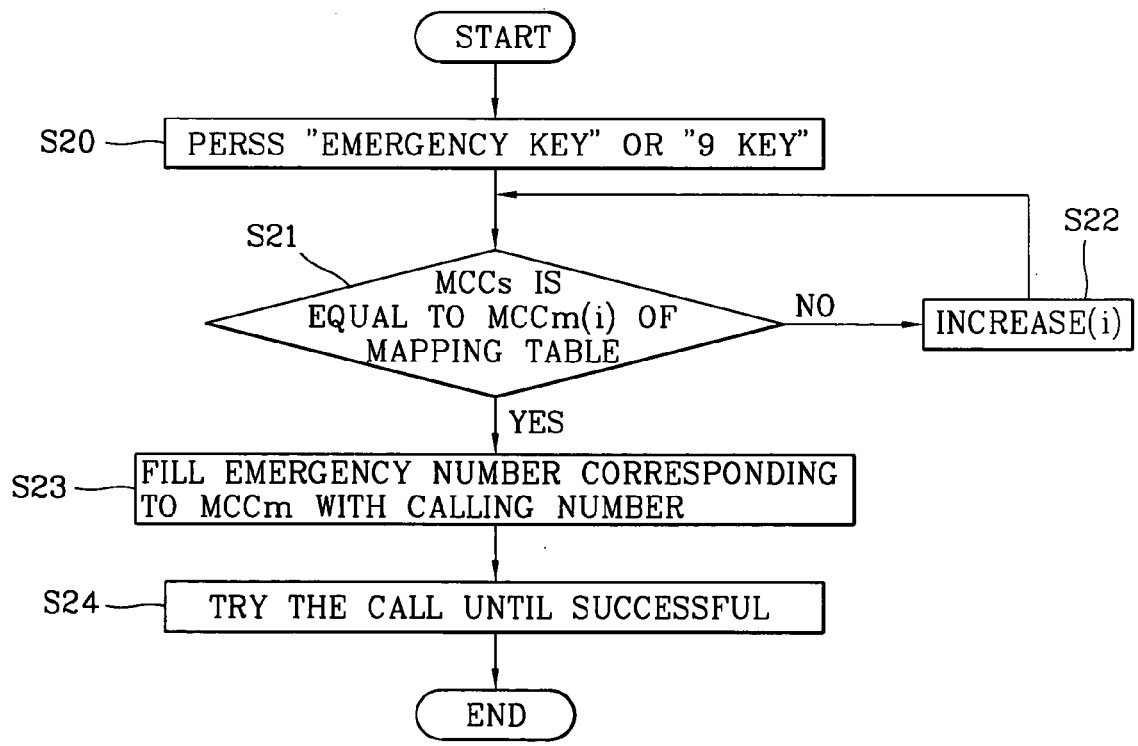
FIG. 4 is a flow chart of a process of transmitting an emergency call in the method for transmitting an emergency call of a mobile phone in accordance with the first embodiment of the present invention.

FIG. 3 is a flow chart of a process of updating and storing an MCC in a method for transmitting an emergency call of a mobile phone in accordance with a first embodiment of the present invention and FIG. 4 is a flow chart of a process of transmitting an emergency call in the method for transmitting an emergency call of a mobile phone in accordance with the first embodiment of the present invention.

With reference to FIG. 3, when the overhead message is received from the base station, a mobile station modem (MSM) of the mobile phone updates the MCCs value of the second register whenever a new ESPM is received (S10~S12).

In a state that the second MCCs is stored in the second register, when an emergency key provided with the mobile phone is depressed by the user or the number '9 key' is depressed for a long time by the user, to make an emergency call (S20), as shown in FIG. 4, the MSM recognizes that.

Upon recognizing the emergency call transmission, the MSM sequentially searches the mapping table as shown in FIG. 2 to find out an MCCm identical to the MCCs stored in the second register (S21, S22).

And then, when an MCCm identical to the MCCs is searched, the MSM read out an emergency call number corresponding to the MCCm from the mapping table, attaches the read emergency call number to a destination number field of the message to be transmitted and tries to make an emergency call (S23, 24).

Figure 5:
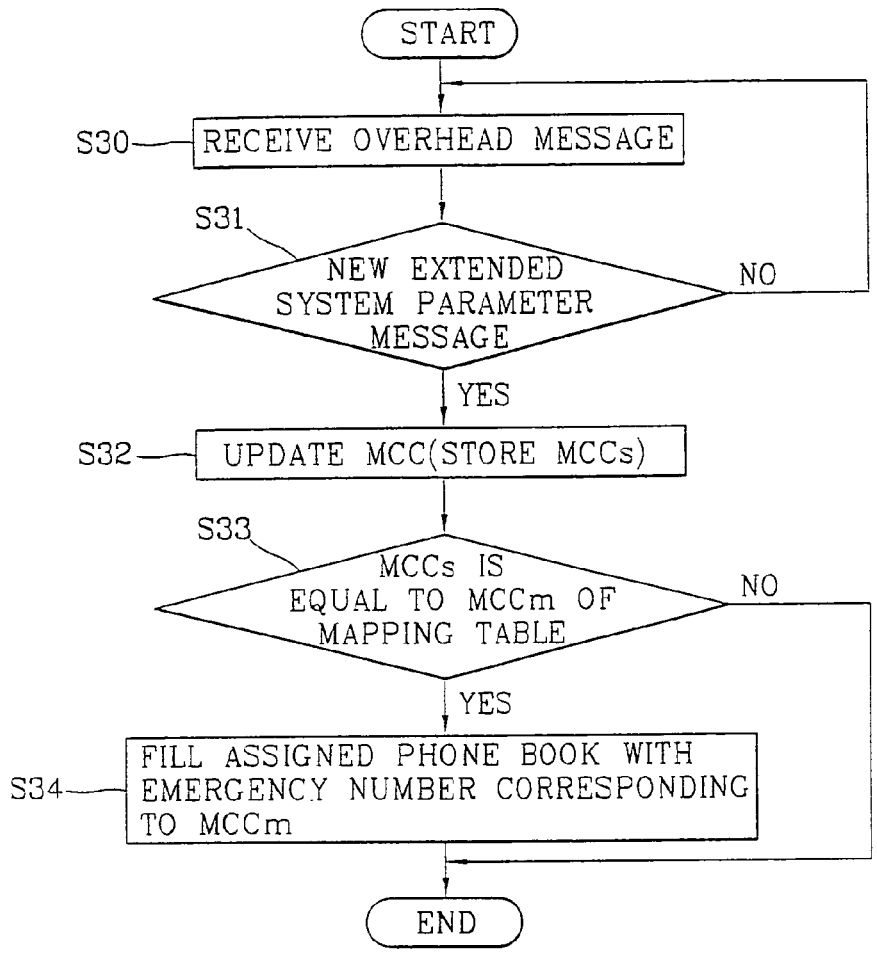
FIG. 5 is a flow chart of a process of updating and storing an MCC in a method for transmitting an emergency call of a mobile phone in accordance with a second embodiment of the present invention.
Figure 6:
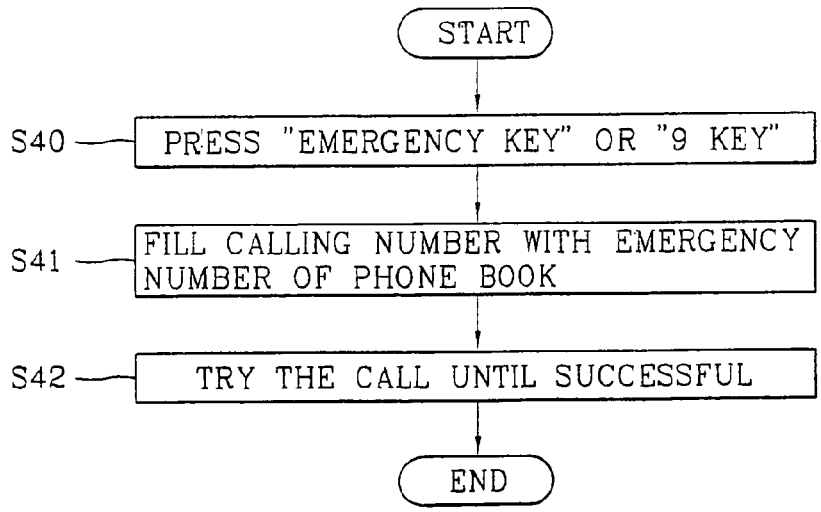
FIG. 6 is a flow chart of a process of transmitting an emergency call in the method for transmitting an emergency call of a mobile phone in accordance with the second embodiment of the present invention.

FIG. 5 is a flow chart of a process of updating and storing an MCC in a method for transmitting an emergency call of a mobile phone in accordance with a second embodiment of the present invention, and FIG. 6 is a flow chart of a process of transmitting an emergency call in the method for transmitting an emergency call of a mobile phone in accordance with the second embodiment of the present invention With reference to FIG. 5, when a new ESPM is received, the MSM stores the MCCs in the second register (S30~S32). At the same time, the MSM searches an MCCm identical to the MCCs from the mapping table and stores its emergency call number corresponding to the searched MCCm in a phone book (S33). And then, the MSM links a read address of the phone book storing the emergency call number to the emergency call key or to '9 key' (S34). That is, in case of using the '9 key' as a one-touch dial, the emergency call number is stored in the address '9' of the phone book.

Accordingly, as shown in FIG. 6, when the one-touch dial, the '9' key' is depressed by the user (S40), the emergency call number stored in the address '9' of the phone book is read and making an emergency call is automatically tried (S41, S42).

As so far described, according to the method for transmitting an emergency call of a mobile phone of the present invention, after the MCCm identical to the MCCs provided from the base station is searched, the emergency call number corresponding to the searched MCCm is read out from the mapping table, thereby trying to making an emergency call.

In addition, according to the method for transmitting an emergency call of a mobile phone of the present invention, after the MCCm identical to the MCCs provided from the base station is searched, the emergency call number corresponding to the searched MCCm is stored in the phone book. And then, the read address of the phone book in which the emergency call number has been stored is linked to the emergency calling key or '9' key.

Accordingly, even though the user is not aware of the emergency call number of a country or an area where he uses his mobile phone to make an emergency call or even though he or she is not aware of a one-touch dial number or a manual for making a call, the user can easily make an emergency call.

Moreover, by linking the read address of the phone book, in which the emergency call number has been stored, to the key for making an emergency call, making an emergency call can be promptly performed automatically by one-time key manipulation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for transmitting an emergency call using a CDMA mobile phone during roaming, comprising:
   receiving position recognition information from a base station;
   identifying an emergency call number from an emergency call mapping table stored in a memory using the position recognition information;
   storing the emergency call number in a phone book of the mobile phone;
   linking an emergency key to the emergency call number stored in the phone book such that when the emergency key is activated, the emergency number stored in the phone book is directly dialed without comparing the stored emergency number to other emergency numbers in the emergency call mapping table; and
   transmitting an emergency call using the emergency key, wherein the position recognition information is periodically transmitted through an extended system parameter message (ESPM) of a paging channel from the base station, and
   wherein the emergency call mapping table includes position recognition information allocated by countries and emergency call numbers corresponding to the position recognition information such that the emergency call number can be identified from the emergency call mapping table using the position recognition information in the ESPM without requiring modification of the ESPM to include an emergency call number.

2. The method according to claim 1, wherein the position recognition information includes a Mobile Country Code.

3. The method according to claim 1, further comprising:
   shifting a pre-set search position on the emergency call mapping table to a position which corresponds to the received position recognition information when the mobile phone enters an area which corresponds to the received position recognition information.

4. The method according to claim 1, wherein the transmitting step includes: directly transmitting the emergency call using the emergency key.

5. The method according to claim 1, further comprising:
   automatically replacing the emergency number stored in the phonebook with a new emergency number if position recognition information is received indicating a new emergency number.

6. A method for transmitting an emergency call of a CDMA mobile phone, comprising:
   receiving position recognition information from a base station via a forward channel in roaming a mobile terminal;
   searching an emergency call mapping table previously stored in a memory according to the received position recognition information and setting an emergency call number;
   storing the emergency call number in a phone book of the mobile phone
   linking a one-touch dial to the emergency number stored in the phone book such that when the one-touch dial is activated, the emergency number stored in the phonebook is directly dialed without comparing the stored emergency number to other emergency numbers in the emergency call mapping table; and
   transmitting an emergency call by using the one-touch dial,
   wherein the position recognition information is transmitted through an extended system parameter message (ESPM) of the forward channel, and
   wherein the emergency call mapping table includes position recognition information allocated by countries and emergency call numbers corresponding to the position recognition information such that the emergency call number can be identified from the emergency call mapping table using the position recognition information in the ESPM without requiring modification of the ESPM to include an emergency call number.

7. The method according to claim 6, wherein a read address of the phone book is identical to the number of the one-touch dial.

8. The method according to claim 6, wherein the position recognition is information is a Mobile Country Code.

9. The method according to claim 6, further comprising:
   automatically replacing the emergency number stored in the phone book with a new emergency number if position recognition information is received indicating a new emergency number.

10. A method for transmitting an emergency call of a CDMA mobile phone, comprising:
    allocating position recognition information and an emergency call number to a mapping table;
    receiving position recognition information that is periodically transmitted from a base station;
    searching an emergency call number by comparing the received position recognition information to position recognition information stored in the mapping table and storing the emergency call number in a phone book of the mobile terminal;
    linking a read address of the emergency call number stored in the phonebook to a one-touch dial;
    automatically replacing the emergency number stored in the phonebook with a new emergency number if new position recognition information is received indicating the mobile phase has moved to a new position by searching the mapping table to identify the new position information and the corresponding new emergency number and replacing the emergency number stored in the phonebook with the new emergency phone number; and making an emergency call by using the one-touch dial, wherein the position recognition information is transmitted through an extended system parameters message.

11. The method according to claim 10, wherein the emergency number stored in the phone book is directly dialed without comparing the received position recognition information to position recognition information stored in the first memory.

12. A method for making an emergency phone call using a phone in a CDMA mobile communication system, comprising:
   receiving current location information;
   searching a table in the phone to locate an emergency phone number corresponding to the current position information;
   storing the emergency call number in an address of a phone book stored in the phone; and
   linking the emergency number stored in the phone book with an emergency activation mechanism on the phone such that when the emergency activation mechanism is activated, the emergency number stored in the phone book is directly dialed without comparing the emergency phone number with other phone numbers in the table,
   wherein the position recognition information is transmitted through an extended system parameters message, and
   wherein the table includes position recognition information allocated by countries and emergency call numbers corresponding to the position recognition information such that the emergency call number can be identified from the table using the position recognition information in the ESPM without requiring modification of the ESPM to include emergency call number.

13. The method of claim 12, wherein the emergency activation mechanism an alpha-numeric key of the phone.

14. The method of claim 13, wherein the key is a one-touch key of the phone.

15. The method of claim 12, wherein the current location information includes a Mobile Country Code.

16. The method according to claim 12, further comprising:
   automatically replacing the emergency number stored in the phonebook with a new emergency number if position recognition information is received indicating a new emergency number.

17. A method for transmitting an emergency call using a mobile phone during roaming, comprising:
   receiving a mobile country code from a base station; and
   using the mobile country code to identify a national emergency number from an emergency call number mapping table stored in a memory,
   wherein:
   the identified national emergency number is stored in a read address of a phone book,
   the read address of the phone book in which the national emergency number is stored is linked to the emergency call key,
   the emergency call is directly transmitted using the emergency call key, and
   the mobile country code is periodically transmitted through an extended system parameters message (ESPM) from a base station to thereby update the phone book with the emergency number.

18. The method according to claim 17, wherein the emergency call number mapping table includes mobile country codes and the national emergency call numbers corresponding to the mobile country codes.

19. The method according to claim 17, wherein identifying the national emergency call number is an emergency call number mapping table comprises varying a search position in the emergency call number mapping table according to the received mobile country code.

20. The method according to claim 19, wherein when varying the search position, a search position pre-set on the emergency call number mapping table when the user is in a different area is moved to a region in which the same mobile country code as the currently received mobile country code.

21. The method according to claim 19, wherein the mobile country code is stored in memory when it is received, and is compared with the mobile country code in the emergency call number mapping table to identify the national emergency call number.

22. The method according to claim 17, wherein an emergency call is transmitted by one touch dialing.

23. The method according to claim 17, wherein the read address of the phone book is identical to the number of the emergency call key.

24. The method according to claim 17, further comprising:
   allocating the mobile country code and the national emergency call number to a mapping table.

* * * * *